Patented June 19, 1934

1,963,468

UNITED STATES PATENT OFFICE 1,963,468

PROCESS OF PREPARING STORAGE BATTERY PLATES

Georg Kränzlein, Frankfort - on - the - Main-Hochst, Richard Karl Müller, Bad Soden on Taunus, and Ludwig Wilhelm Berlin, Frankfort-on-the-Main-Hochst, Germany, assignors to I. G. Farbenindustrie Aktiengesellschaft, Frankfort-on-the-Main, Germany No Drawing. Application October 19, 1929, Serial No. 401,010. In Germany October 26, 1928

1 Claim. (Cl. 136—27)

This invention relates to unformed accumulator plates for acid storage batteries and to a process of preparing the same.

Accumulator plates at present on the market, which have been prepared by using glycerine, particularly cathodes, have the disadvantage that after a number of discharges vesicles are formed on their surface, which lead to short-circuits and detachment of the active mass. Besides, it is not possible to transport unformed plates made with glycerine paste, since owing to the insufficient solidity of the paste the shocks due to transport are liable to cause detachment of the mass.

We have now found that highly efficient accumulator plates for acid storage batteries can be made by substituting glycol for glycerine in the manufacture of the lead paste to be used. Cathodes prepared in this manner do not form vesicles on their surface so that premature short-circuit in the accumulator is avoided. On the other hand, in the manufacture of anodes according to the invention detachment of the active mass from the grid-skeleton is reduced to a minimum. The plates, when being dried, do not develop fissures or cracks, as often occur in the case of plates made with glycerine paste:

The following examples serve to illustrate our invention, but they are not intended to limit it thereto, the parts being by weight:—

1. 100 parts of lead dust (containing about 65 per cent. of PbO) are mixed with 2.5 parts of finely powdered barium sulfate (size of particles, 0.001 to 0.01 mm. in cross-section) and to this mixture are then added 20.0 parts of diluted sulfuric acid (specific gravity 1.27) while well agitating the mass. There are then added 3 parts of ethylene glycol, whereupon the whole is thoroughly kneaded in a mixing and kneading machine so as to obtain a paste which can easily be kneaded and spread; this paste is then filled and spread into a grid-skeleton in the usual manner. In the manufacture of anodes no addition of barium salt is needed. As compared with unformed accumulator plates made from a glycerine paste, those made by this invention have the advantage that they are more stable and in particular have no tendency to form vesicles on their surface. In capacity also, the new accumulator plates are at least equivalent, in most cases even superior to the glycerine plates at present on the market. The pastes may be prepared in various manners: the composition of the paste, however, must be varied according to the purpose for which the accumulator type is to be used.

2. 1000 parts of lead dust are treated in the ball mill together with 25 parts of $BaSO_4$ (which has been ground twice in the colloplex mill). A mixture of 200 parts of $H_2SO_4$ (specific gravity 1.27) and of 30 parts of glycol is then added to said powder whereupon the whole is thoroughly kneaded in a mixing and kneading machine for about 20 to 30 minutes so as to obtain a paste; this paste is then filled and spread into a grid-skeleton in the usual manner.

We claim:

In the process of preparing accumulator plates for acid storage batteries the step which consists in intimately mixing ethylene glycol and sulfuric acid with the active mass containing finely divided lead and barium sulfate before the mass is filled and spread into the grid skeleton.

GEORG KRÄNZLEIN.
RICHARD KARL MÜLLER.
LUDWIG WILHELM BERLIN.